United States Patent
Eberlein

(10) Patent No.: US 9,348,929 B2
(45) Date of Patent: May 24, 2016

(54) MOBILE MAPPING OF QUICK RESPONSE (QR) CODES TO WEB RESOURCES

(71) Applicant: SAP SE, Walldorf (DE)

(72) Inventor: Peter Eberlein, Malsch (DE)

(73) Assignee: SAP SE, Walldorf (DE)

( * ) Notice: Subject to any disclaimer, the term of this patent is extended or adjusted under 35 U.S.C. 154(b) by 583 days.

(21) Appl. No.: 13/663,745

(22) Filed: Oct. 30, 2012

(65) Prior Publication Data
US 2014/0117076 A1    May 1, 2014

(51) Int. Cl.
*G06F 17/00*    (2006.01)
*G06F 17/30*    (2006.01)

(52) U.S. Cl.
CPC ................. *G06F 17/30887* (2013.01)

(58) Field of Classification Search
CPC ........... G06K 7/1447; G06K 19/06037; G06F 17/22; G06F 17/30887; G06Q 30/02
USPC ................. 235/375, 462.01–462.49
See application file for complete search history.

(56) References Cited

U.S. PATENT DOCUMENTS

| 7,971,010 B2 | 6/2011 | Schmelter et al. |
| 2011/0000958 A1* | 1/2011 | Herzig ........................ 235/375 |
| 2011/0062237 A1 | 3/2011 | Chaves |
| 2012/0173747 A1 | 7/2012 | Roesch et al. |
| 2012/0210118 A1 | 8/2012 | Chaves et al. |

OTHER PUBLICATIONS

Lalit Aggarwal, "5 Free QR Code Generator Chrome Extensions", Oct. 1, 2012, http://www.ilovefreesoftware.com/01/featured/free-qr-code-generator-chrome-extensions.html.*

* cited by examiner

*Primary Examiner* — Laura Gudorf
(74) *Attorney, Agent, or Firm* — Brake Hughes Bellermann LLP

(57) ABSTRACT

A method includes receiving a target Uniform Resource Locator (URL), receiving a scan of a Quick Response (QR) code, where the QR code includes an alias URL, and mapping the alias URL encoded on the QR code to the target URL.

20 Claims, 4 Drawing Sheets

| Alias URL | Target URL |
|---|---|
| http://www.sap.com/qr/1 | http://www.bus.com/busroute1.pdf |
| http://www.sap.com/qr/2 | http://www.bus.com/busroute22.pdf |
| http://www.sap.com/qr/3 | http://www.bus.com/busroute27.pdf |

MOBILE MAPPING OF QUICK RESPONSE (QR) CODES TO WEB RESOURCES

TECHNICAL FIELD

This description relates to systems and techniques for mobile mapping of Quick Response (QR) codes to web resources.

BACKGROUND

A Quick Response (QR) code is a two-dimensional matrix barcode. The QR code is a black and white image that may be used to encode data. A QR code may encode significantly more data than a Universal Product Code (UPC) barcode.

One use of the QR code is to encode a Uniform Resource Locator (URL) to a web resource. For example, a QR code may encode a URL that links to information at a website on the web (also referred to as the Internet). Scanning the QR code with a QR scanner (e.g., a camera on a phone with a QR reader application) may direct a browser or other application to the website at the URL that was encoded by the QR code. A QR code may be located in print media or attached to objects or at a location so that when the QR code is scanned, the encoded URL points to information on the web that is related to the object where the QR code is located.

When a QR code is associated with an object or location, it is important that the correct QR code has been placed with the correct object. In this manner, when the QR code is scanned, the encoded URL will point the browser application to the correct website that provides information, as appropriate, relating to the associated object or location.

Consideration is now being given to systems and methods to ensure that the QR code and its designated location or object that it is attached to always match.

SUMMARY

According to one general aspect, a method includes executing instructions recorded on a non-transitory computer-readable storage medium using at least one processor. The method includes receiving a target Uniform Resource Locator (URL), receiving a scan of a Quick Response (QR) code, where the QR code includes an alias URL, and mapping the alias URL encoded on the QR code to the target URL.

Implementations may include one or more of the following features. For example, the method may include receiving additional multiple different target URLs, receiving a scan of a different QR code for each of the different target URLs, where each of the QR codes includes a different alias URL, mapping each of the different alias URLs encoded on the different QR codes to one of the target URLs, and creating a table of the mappings. The method may include generating a redirect file from the mapping and exporting the redirect file to a web server or to a redirect service such that the target URL is browsed to in response to a scan of the QR code. The method may include modifying the redirect file by changing the target URL to a new target URL such that the new target URL is browsed to in response to a scan of the QR code. The method may include generating the QR code with the alias URL and a unique identifier. Receiving the scan of the QR code may occur after attaching a QR code to a desired location that is associated with the target URL. The method may include changing the mapping of the alias URL to a different target URL. Receiving a target Uniform Resource Locator (URL) may include receiving a request to navigate a browser application to the target URL.

In another general aspect, a non-transitory computer-readable storage medium stores instructions that, when executed, cause one or more processors to perform the actions of receiving a target Uniform Resource Locator (URL), receiving a scan of a Quick Response (QR) code, the QR code including an alias URL, and mapping the alias URL encoded on the QR code to the target URL.

Implementations may include one or more of the following features. For example, the non-transitory computer-readable storage medium may include instructions that, when executed, cause one or more processors to perform the actions of receiving additional multiple different target URLs, receiving a scan of a different QR code for each of the different target URLs, where each of the QR codes includes a different alias URL, mapping each of the different alias URLs encoded on the different QR codes to one of the target URLs and creating a table of the mappings. The non-transitory computer-readable storage medium may include instructions that, when executed, cause one or more processors to perform the actions of generating a redirect file from the mapping and exporting the redirect file to a web server or to a redirect service such that the target URL is browsed to in response to a scan of the QR code. The non-transitory computer-readable storage medium may include instructions that, when executed, cause one or more processors to perform the action of modifying the redirect file by changing the target URL to a new target URL such that the new target URL is browsed to in response to a scan of the QR code. The non-transitory computer-readable storage medium may include instructions that, when executed, cause one or more processors to perform the action of generating the QR code with the alias URL and a unique identifier. The non-transitory computer-readable storage medium where receiving the scan of the QR code occurs after attaching a QR code to a desired location that is associated with the target URL. The non-transitory computer-readable storage medium may include instructions that, when executed, cause one or more processors to perform the action of changing the mapping of the alias URL to a different target URL.

In another general aspect, a method includes executing instructions recorded on a non-transitory computer-readable storage medium using at least one processor. The method includes encoding a Quick Response (QR) code with an alias Uniform Resource Locator (URL), attaching the QR code to an object, navigating a browser application to a target URL that is associated with the object, scanning the QR code and mapping the alias URL from the scanned QR code to the target URL.

Implementations may include one or more of the following features. For example, scanning the QR code may occur after attaching the QR code to the object. The method may include generating a redirect file from the mapping and exporting the redirect file to a web server or to a redirect service such that the target URL is browsed to in response to a scan of the QR code. The method may include modifying the redirect file by changing the target URL to a new target URL such that the new target URL is browsed to in response to a scan of the QR code. Encoding a Quick Response (QR) code may include encoding the QR code with the alias URL and a unique identifier.

The details of one or more implementations are set forth in the accompanying drawings and the description below. Other features will be apparent from the description and drawings, and from the claims.

BRIEF DESCRIPTION OF THE DRAWINGS

FIG. 2 is an example table of mappings.

DETAILED DESCRIPTION

This document describes a device and techniques for the mobile mapping of Quick Response (QR) codes to web resources. In one example implementation, multiple QR codes may be generated, where each QR code is encoded with a unique alias uniform resource locator (URL). The QR codes may be printed, for example, on stickers. The stickers with the QR codes may then be affixed to objects at any location that is to be linked to a web resource without regard to which sticker goes with which object. When a sticker with a QR code has been affixed to an object, a user may navigate a browser application to a target URL. For instance, the target URL may be a website that is associated with one of the objects. The QR code may be scanned and associated with the target URL that is associated with the specific object. The scanning of the QR code and associating the QR code with the target URL creates a mapping between the alias URL encoded on the QR code and the target URL. The mapping of the alias URL and the target URL may be exported and loaded to a web server that processes requests sent to the alias URL such that when the QR code is scanned, the browser application will be directed to the target URL, even though the alias URL is encoded on the QR code.

In this manner, a user may easily create a mapping between a target URL and an alias URL that is encoded on the QR code. The user may repeat this process for multiple QR codes and create a mapping table that can be loaded to a web server such that when one of the QR codes is scanned, a browser application will be directed to the appropriate target URL, as mapped in the mapping table on the web server. Thus, a scanned QR code encoded with the alias URL redirects a browser application to the target URL. In this manner, the process of tagging an object with a QR code that links to a web resource is improved because the object may be tagged with any of the QR codes having a unique alias URL. After an object is tagged with the QR code, then the mapping between the alias URL and the target URL may be done. This optimizes the attachment of QR codes to objects because, for example, any sticker with a QR code may be attached to the object without regard to maintaining any special order or predefined mapping when the stickers are attached. This may help prevent errors such as attaching a QR code with an encoded URL that links to the wrong web resource for the object that it is attached. Also, it allows changing the mapping afterwards without replacing the QR code by simply changing the mapping table on the web server.

Figure 1:
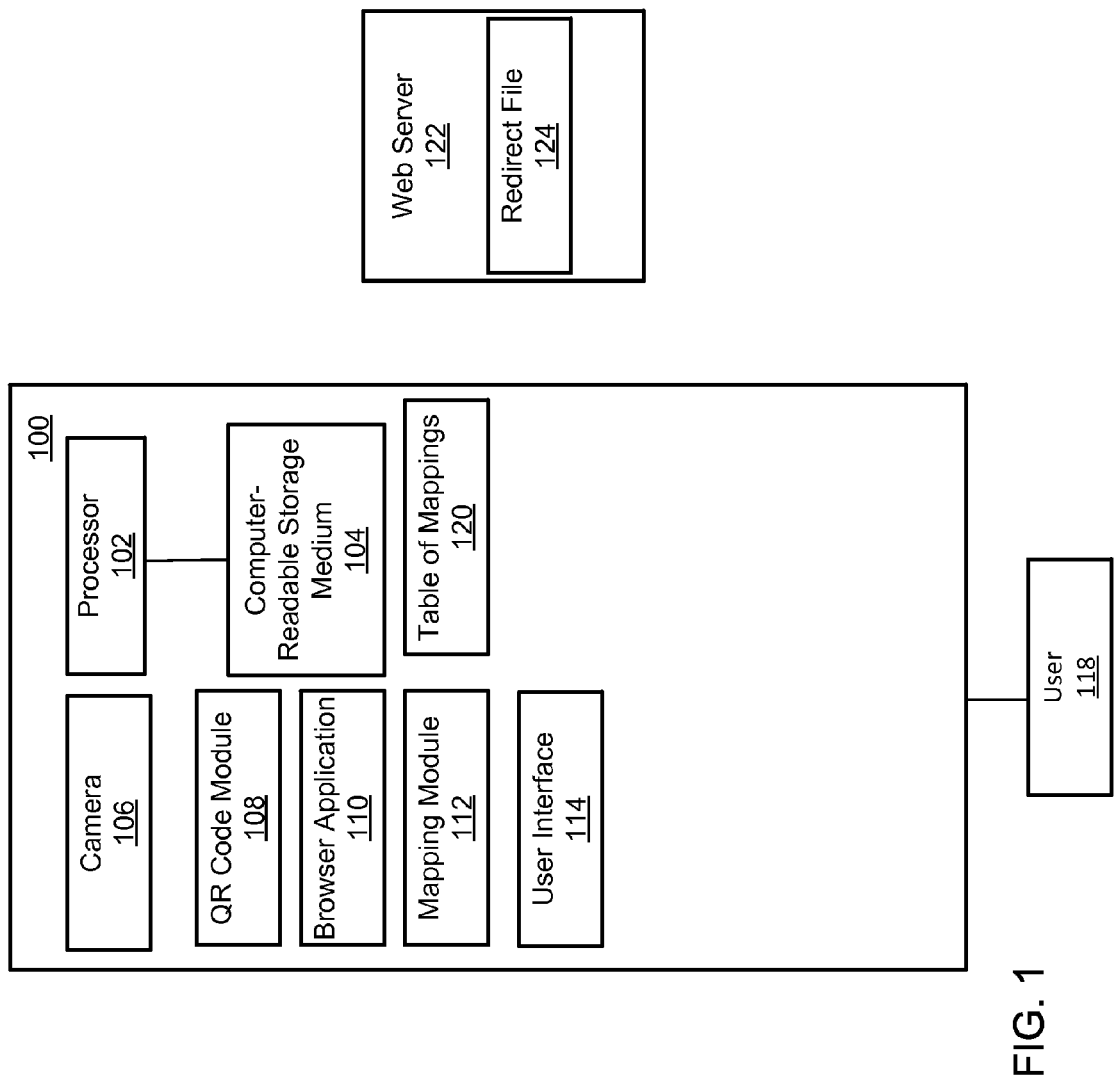
FIG. 1 is a block diagram of a device for mapping of Quick Response (QR) codes to mobile resources.

Referring to FIG. 1, an example block diagram illustrates a device 100 for mapping QR codes to web resources. The device 100 may include any type of computing device such as, for example, a computer, a laptop computer, a notebook computer, a smart phone, a cellular phone or any other type of computing device.

The device 100 includes at least one processor 102 and at least one computer-readable storage medium 104. The at least one processor 102 may be configured to execute instructions stored on the at least one memory 104 that, when executed, cause the at least one processor 102 to perform one or more actions. The one or more actions includes performing actions using the other components of the device 100. Of course, the at least one processor 102 and the computer-readable storage medium 104 may be understood to represent or include any known or future examples of corresponding components that may be utilized in the context of the device 100. Further, it may be appreciated that any additional, or otherwise conventional, components may be utilized in the context of the device 100, including, for example, components related to power, communications, input/output functions, and many other conventional features and functions that would be understood by one of skill in the art to be potentially implemented in the context of the device 100.

Moreover, although the device 100 is illustrated in the example of FIG. 1 as a single computing device, it may be understood that the device 100 may represent two or more computers in communication with one another. It may be appreciated that any two components illustrated in the example of FIG. 1 may be executed together as a single component. Conversely, any single component of FIG. 1 may be understood to be executed using two or more subcomponents.

The device 100 includes a camera 106, a QR code module 108, a browser application 110, a mapping module 112 and a user interface 114. In addition to performing the conventional functions of a camera, the camera 106 may be used to view and/or capture an image of a QR code. Other types of image capturing components also may be used in the device 100 to view and/or capture an image of a QR code.

The QR code module 108 may be capable of scanning, decoding, and creating or encoding QR codes. The QR code module 108 may be an application such as, for example, an app on a smart phone that is capable of performing these functions. For example, the QR code module 108 may function as a QR code reader. As a QR code reader, the QR code module 108 may receive an image of a QR code from the camera 106 and decode the QR code. In one implementation, the QR code may be encoded with a uniform resource locator (URL) and the QR code module 108 may be configured to decode the URL and communicate the URL to the browser application 110. The browser application 110 receives the URL and may request the content located at the URL on the user interface 114 for viewing by a user 118.

In one implementation, the QR code module 108 may be configured to create or encode QR codes. For instance, the QR code module 108 may be capable of encoding a URL as a QR code. A user may enter a URL and then encode the URL as a QR code using the QR code module 108. The resulting QR code may be displayed on the user interface 114 and/or that may be printed or otherwise transferred to a physical medium for display and future scanning and decoding.

The browser application 110 may be any browser application 110 such as, for example, Internet Explorer, Chrome, FireFox, etc. The browser application 110 may be used to navigate to web resources using URLs. As discussed above, the browser application 110 may receive a URL from the QR code module 108 and request the web resources associated with the URL.

In one example implementation, the device 100 may be used in a process to tag objects with QR codes using alias URLs and to create a mapping between the alias URLs and respective target URLs. The QR code module 108 may be used to create multiple QR codes and encode each of the QR codes with a unique, alias URL. The QR codes having the unique, alias URLs may be printed on paper or labels or on other physical media including, for example, signs (e.g., weather resistant acrylic signs). The QR codes may be transferred to any type of physical media that is capable of being affixed to an object. Alternatively, the QR codes containing the alias URLs may be generated by a different computing device and pre-printed on or transferred to the physical media.

The alias URL may be a URL for a web server that will be used to receive the request for the alias URL from a browser application and to re-direct the browser application to web resources located at a target URL using a mapping between the alias URL and the target URL, as described in more detail below. The desired web resource is not located at the alias URL. Instead, the desired web resource is located at an associated target URL.

Each alias URL may include a unique identifier such that each of the encoded QR codes is unique. For instance, the QR code module 108 may encode each of the QR codes with the alias URL that includes a unique identifier such that each of the QR codes is unique, even though the alias URL may be directed to a same web server. The unique identifier may be any alpha numeric code that is appended to or part of the alias URL.

The generated QR codes having the unique, alias URL may be transferred to a physical media capable of being affixed to an object. The user 118 performing the tagging process can then affix any of the QR codes to a particular object. It does not matter which of the QR codes is affixed to or associated with the particular object. Affixing a QR code to a particular object may mean that the QR code is physically attached to the object itself. In other instances, affixing a QR code also may mean that the QR code is located or attached near the object and not necessarily physically attached to the object itself. This may be the case, for example, when tagging objects in a museum with QR codes. The QR codes may not be attached to the object itself, but instead may be located on a wall near the object or a base of the object or on a display case near the object so as not to devalue or detract from the museum object. In this manner, affixing a QR code to an object also means affixing a QR code at a location throughout this document.

After the QR code has been affixed to the object, the user 118 may navigate the browser application 110 to a desired target URL that points to content related to the object or its location. Alternatively, the user 118 may enter the target URL directly to the mapping module 112. The user 118 may scan the QR code that has been affixed to the object using the camera 106 and the QR code module 108. The QR code module 108 decodes the alias URL from the scanned QR code and communicates the alias URL to the mapping module 112. The mapping module 112 is configured to create a mapping between the alias URL encoded on the QR code and the target URL. The mapping between the alias URL encoded on the QR code and the target URL may be maintained in a table of mappings 120. The table of mappings 120 may be a file or database that can be used to maintain the mappings between alias URLs and target URLs. The table of mappings 120 may be stored on the computer-readable storage medium 104 or other memory module (not shown). In this manner, the QR code affixed to the object will match with the desired web resource.

The user may repeat this process of affixing any of the QR codes to an object, navigating the browser application 110 to a desired target URL and scanning the QR code such that the mapping module 112 creates the mapping between the alias URL and the target URL and add each new mapping to the table of mappings 120. In this manner, the process of tagging many objects with QR codes is simplified because it does not matter which QR code is initially associated with the object since the QR code includes just an alias URL that is later mapped to a desired target URL that has relevance to the object. The device 100 including its components, as described above, may assist in preventing errors in a tagging project such as attaching QR code that link to the wrong web resources.

Referring also to FIG. 2, an example table of mappings 120 is illustrated. The table of mappings 120 includes an alias URL column and a target URL column. In this example, each alias URL includes a unique identifier. For instance, the alias URL in the first row includes the unique identifier "1". The alias URL in the second row includes the unique identifier "2" and the alias URL in the third row includes the unique identifier "3." The target URL is the URL for the location of the web resource that is to be associated with an object. In this example, the target URLs are in the second column.

The mapping module 112 creates the table of mappings 120 by linking or associating the alias URL with a selected target URL. The alias URL is obtained by scanning the QR code containing the alias URL (e.g., http://www.sap.com/qr/1). The QR code module 108 communicates the alias URL to the mapping module 112. The browser application 110 may be navigated to a target URL (e.g., http://www.bus.com/bus-routel.pdf) and the browser application 110 may communicate the target URL to the mapping module 112. Alternatively, the user may enter the target URL directly into the user interface 114 instead of navigating to the target URL using the browser application 110. The mapping module 112 creates the association between the alias URL (e.g., http://www.sap.com/qr/1) and the target URL (e.g., http://www.bus.com/bus-routel.pdf) in the table of mappings 120, as illustrated in FIG. 2. The process may be repeated to create the association between the alias URLs and target URLs.

The mapping module 112 may be an application that is running on the device 100 and that uses the processor 102 to create the association between the alias URL and the target URL. The association or mapping may be formatted into a table of mappings 120. The mapping module 112 may generate a redirect file 124 from the table of mappings 120. The redirect file 124 may be a file that is formatted for use by a web server, such as web server 122. The redirect file 124 may be exported to the web server 122. For example, the redirect file 124 may be exported to the web server 122 over a network (e.g., a wired or wireless network) including the Internet.

The web server 122 may import the redirect file 124. The redirect file 124 includes a mapping of the alias URLs to the target URLs. When a request is received by the web server 122 from a browser application for one of the alias URLs, the web server looks up the alias URL in the redirect file 124 and then redirects the requesting browser application to the target URL associated with the alias URL such that the content from the target URL is rendered in the browser application. When a browser application such as browser application 110 receives a redirect response from the web server 122, it automatically loads the target URL that was returned in that redirect response from the web server 122.

In other example implementations, a redirection service may be used to export the mapping of the alias URLs to the target URLs. For example, a redirection service may be available on the Internet to perform the redirection so that its application programming interfaces (APIs) would be exposed as services like SOAP web services, REST services and the like that are used by the mapping module 112 to create the mapping in order to make the QR codes link to the desired target URLs. In this case, the redirection service takes the role of the web server 122.

Thus, in one example, when a user later scans one of the QR codes using a QR code reader, then QR code reader extracts and decodes the alias URL and communicates the alias URL to a browser application. The browser application requests the alias URL. The request is sent to the web server 122. The web server 122 looks up the target URL associated with the requested alias URL from the redirect file 124. The web server 122 responds to the request with a redirect response containing the target URL. The browser application request the target URL from a web server associated with the target URL and the web server delivers the content at the target URL for rendering by the browser application on a user interface. The web server that delivers the content associated with the target URL may be the same web server 122 or may be a web server different than the web server 122.

In one example implementation, the table of mappings 120 and/or the redirect file 124 may be updated to change the mapping of alias URLs to target URLs. For instance, if the target URL has changed, the table of mappings 120 and/or the redirect file 124 may be changed directly. If the table of mappings 120 is changed, a new redirect file may be generated and exported to the web server 122.

In one example implementation, the device 100 may be used for large scale tagging of locations with QR codes. For instance, it may be desirable to tag all public buildings in a city with QR codes that provide a link to web resources related to the public buildings. The device 100 may be used to generate and prepare multiple QR codes with each QR code having a unique alias URL. The QR codes may be generated and encoded in advance and printed on the physical media that will be affixed to the public building.

Once the QR codes have been generated and printed, any of the QR codes may be affixed to one of the buildings. It doesn't matter which QR code is first associated with the building. Once the QR code has been selected, and likely affixed to the building, then the QR code may be scanned using the camera 106 and the QR code module 108. The QR code module 108 decodes the QR code, obtains the alias URL and communicates the alias URL to the mapping module 112.

Next, the mapping module 112 receives a target URL, which is the location of the web resources associated with the particular building. The target URL may be obtained by inputting the target URL directly into the mapping module 112 through the user interface 114. Alternatively, the target URL may be obtained by navigating the browser application 110 to the target URL such that the mapping module 112 receives the target URL from the browser application 110.

The mapping module 112 maps the alias URL from the scanned QR code to the target URL and adds the association to the table of mappings 120. This process may be repeated for each building that is being tagged with a QR code with each mapping of an alias URL to a target URL being added to the table of mappings 120. The table of mappings 120 may be converted to a redirect file 124 that is exported to a web server 122.

When a user later scans one of the QR codes on one of the buildings using a QR code reader (e.g., a QR code module), the QR code reader decodes the QR code and passes the alias QR code to a browser application (e.g., browser application 110). The browser application requests the alias URL from the web server 122 and the web server returns the target URL corresponding to the requested alias URL as listed in the redirect file 124 in a redirect response. The browser application receives the target URL from the redirect response and then requests the web resources located at the target URL from the appropriate web server.

This is merely one example of a large scale tagging project using the device 100. Other examples may include the tagging of multiple public transportation stops in a city with QR codes, where the web resources associated with the target URLs may provide route, schedule and/or fare information. Another example may include the tagging of multiple objects in a museum. Other projects to tag objects with QR codes, whether it is one object or multiple objects, may benefit from the device 100 and its functionality.

Figure 3:
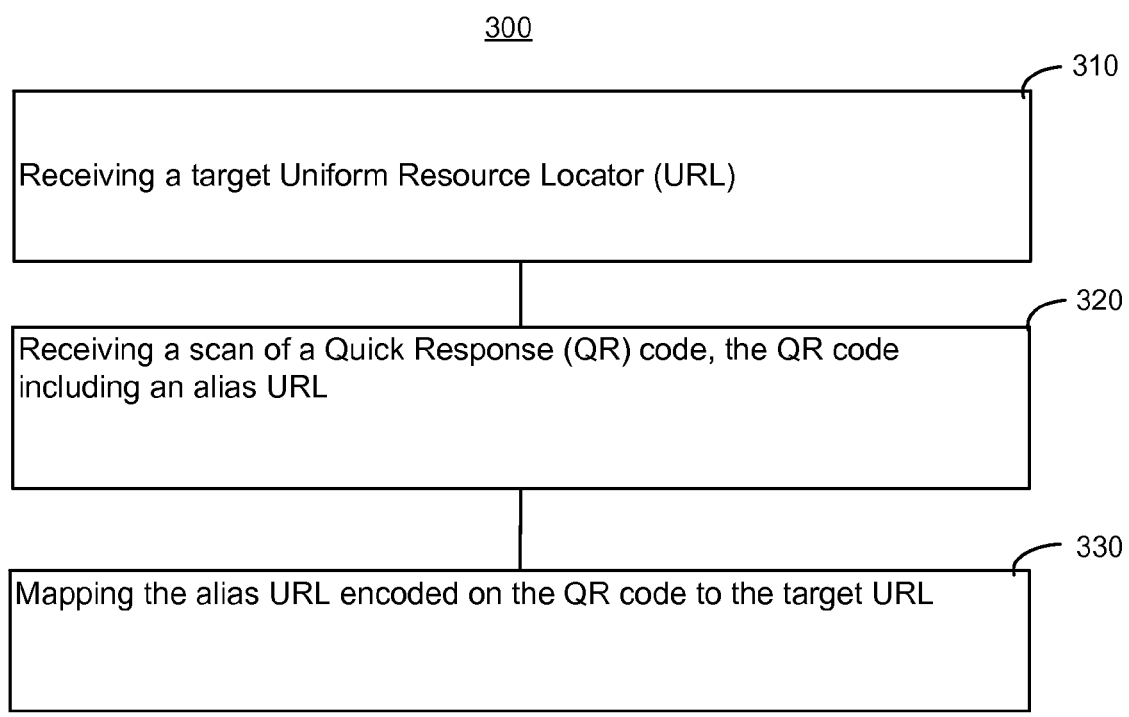
FIG. 3 is a flowchart illustrating example operations of the system of FIG. 1.

Referring to FIG. 3, an example process 300 illustrates example operations of the device 100 of FIG. 1. Process 300 includes receiving a target Uniform Resource Locator (URL) (310). For example, the mapping module 112 of FIG. 1 may receive a target URL from the browser application 110 or directly from input on the user interface 114 (310).

Process 300 includes receiving a scan of a Quick Response (QR) code, where the QR code includes an alias URL (320). For example, the QR code module 108 of FIG. 1 may receive a scan of a QR code that has been encoded with an alias URL (320). The camera 106 may capture the image of the QR code and the QR code module 108 may scan and decode the QR code to obtain the alias URL and pass the alias URL to the mapping module 112. Each alias URL may include a unique identifier such that each alias URL is unique.

Process 300 includes mapping the alias URL encoded on the QR code to the target URL (330). For example, the mapping module 112 of FIG. 1 may map the alias URL to the target URL (330). The mapping module 112 may create a table of mappings 120, which may be stored. The process 300 may be repeated to create additional alias URL and target URL pairs that are added to the table of mappings 120. A redirect file 124 may be generated from the table of mappings 120 and the redirect file 124 may be exported to a web server 122 such that the target URL is browsed to in response to a scan of a QR code.

Figure 4:
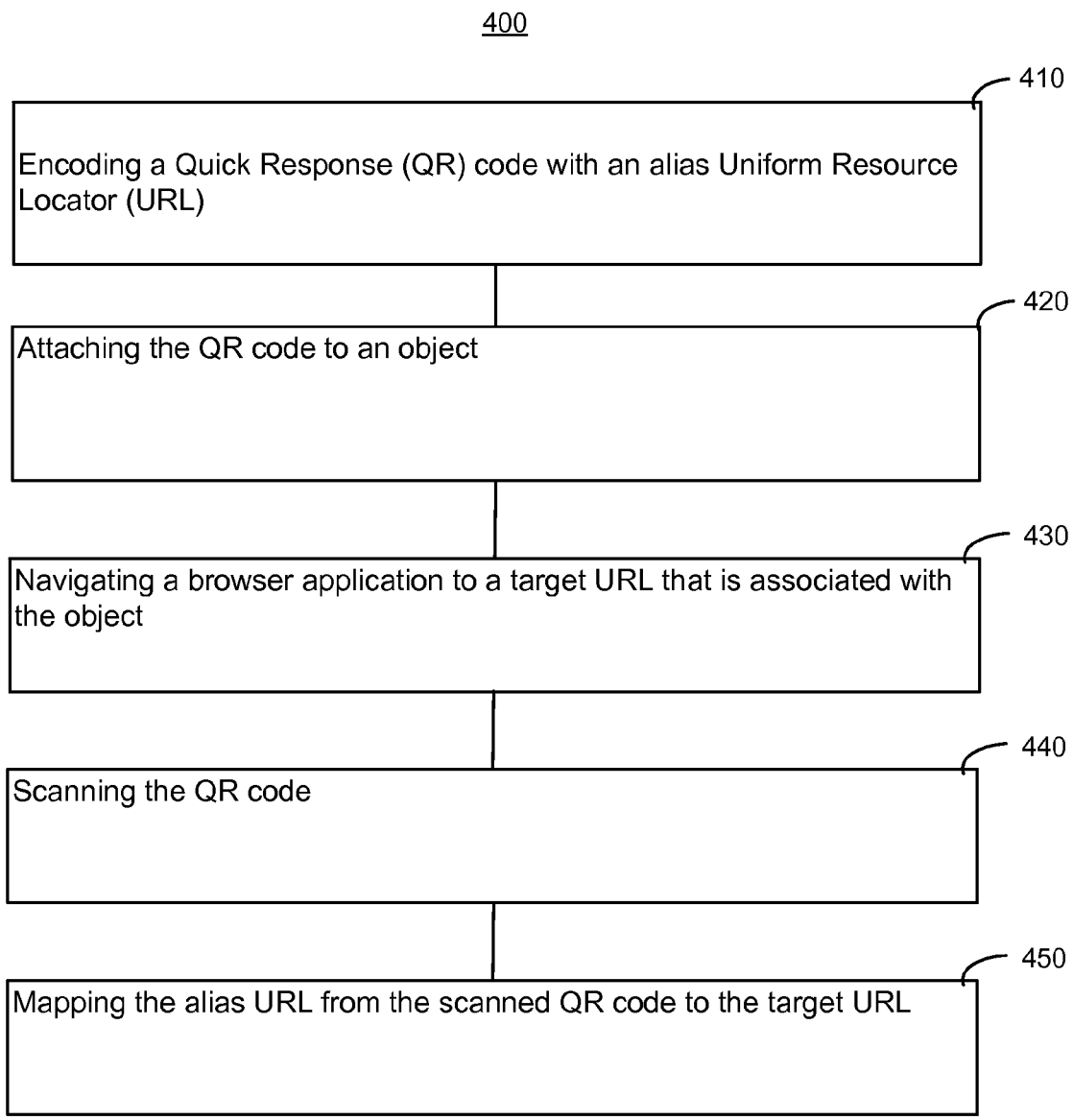
FIG. 4 is a flowchart illustrating example operations of the system of FIG. 1.

Referring to FIG. 4, an example process 400 illustrates example operations of the device 100 of FIG. 1. Process 400 includes encoding a Quick Response (QR) code with an alias Uniform Resource Locator (URL) (410). For example, the QR code module 108 of FIG. 1 may be configured to encode a QR code with an alias URL (410). Each alias URL may include a unique identifier such that each alias URL is unique.

Process 400 includes attaching the QR code to an object (420). For example, the QR code may be transferred (e.g., printed, etched, etc.) to a physical media that is then attached to the object (420). The QR codes containing the alias URLs may be prepared ahead of time prior to tagging objects.

Process 400 includes navigating a browser application to a target URL that is associated with the object (430). For example, the browser application 110 of FIG. 1 may be navigated to a target URL that contains the web resources for the object (430).

Process 400 includes scanning the QR code (440). For example, the QR code module 108 may scan the QR code (440). The camera 106 may capture the image of the QR code to enable the QR code module 108 to scan and decode the QR code. The QR code module 108 may pass the alias URL to the mapping module 112.

Process 400 includes mapping the alias URL from the scanned QR code to the target URL (450). For example, the mapping module 112 may be configured to map the alias URL from the scanned QR code to the target URL (450). The mapping module 112 may create a table of mappings 120, which may be stored. The process 400 may be repeated to create additional alias URL and target URL pairs that are added to the table of mappings 120. A redirect file 124 may be generated from the table of mappings 120 and the redirect file 124 may be exported to a web server 122 such that the target URL is browsed to in response to a scan of a QR code.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method including executing instructions recorded on a non-transitory computer-readable storage medium using at least one processor, the method comprising:
    receiving a target Uniform Resource Locator (URL) associated with an object;
    receiving an initial scan of a Quick Response (QR) code, the QR code being affixed to a physical medium and including an alias URL, wherein the QR code is to be associated with the object; and
    responsive to receiving the initial scan of the QR code, creating a mapping of the alias URL encoded on the QR code to the target URL such that both the QR code and the target URL are associated with the object in response to receiving a subsequent scan of the QR code.

2. The method of claim 1 further comprising:
    receiving additional multiple different target URLs with each different target URL being associated with one object from a plurality of objects;
    receiving an initial scan of a different QR code for each of the different target URLs, wherein each of the different QR codes is affixed to a physical medium and includes a different alias URL and each of the different QR codes is to be associated with one of different target URLs and one of the objects;
    responsive to receiving the initial scan of the different QR codes, creating a mapping of each of the different alias URLs encoded on the different QR codes to the associated one of the target URLs such that both the different QR codes and the target URLs are associated with one of the different objects in response to receiving a subsequent scan of the different QR code; and
    creating a table of the mappings.

3. The method of claim 1 further comprising:
    generating a redirect file from the mapping; and
    exporting the redirect file to a web server or to a redirect service such that the target URL is browsed to in response to a scan of the QR code.

4. The method of claim 3 further comprising modifying the redirect file by changing the target URL to a new target URL such that the new target URL is browsed to in response to a scan of the QR code.

5. The method of claim 1 further comprising generating the QR code with the alias URL and a unique identifier.

6. The method of claim 1 wherein receiving the scan of the QR code occurs after attaching the QR code to a desired location that is associated with the target URL.

7. The method of claim 1 further comprising changing the mapping of the alias URL to a different target URL.

8. The method of claim 1 wherein receiving a target Uniform Resource Locator (URL) includes receiving a request to navigate a browser application to the target URL.

9. A non-transitory computer-readable storage medium storing instructions that, when executed, cause one or more processors to perform the actions of:
    receiving a target Uniform Resource Locator (URL) associated with an object;
    receiving an initial scan of a Quick Response (QR) code, the QR code being affixed to a physical medium and including an alias URL, wherein the QR code is to be associated with the object; and responsive to receiving the initial scan of the QR code, creating a mapping of the alias URL encoded on the QR code to the target URL such that both the QR code and the target URL are associated with the object in response to receiving a subsequent scan of the QR code.

10. The non-transitory computer-readable storage medium of claim 9 further comprising instructions that, when executed, cause one or more processors to perform the actions of:

receiving additional multiple different target URLs with each different target URL being associated with one object from a plurality of objects;

receiving an initial scan of a different QR code for each of the different target URLs, wherein each of the different QR codes is affixed to a physical medium and includes a different alias URL and each of the different QR codes is to be associated with one of different target URLs and one of the objects;

responsive to receiving the initial scan of the different QR codes, creating a mapping of each of the different alias URLs encoded on the different QR codes to the associated one of the target URLs such that both the different QR codes and the target URLs are associated with one of the different objects in response to receiving a subsequent scan of the different QR code; and creating a table of the mappings.

11. The non-transitory computer-readable storage medium of claim 9 further comprising instructions that, when executed, cause one or more processors to perform the actions of:

generating a redirect file from the mapping; and exporting the redirect file to a web server or to a redirect service such that the target URL is browsed to in response to a scan of the QR code.

12. The non-transitory computer-readable storage medium of claim 11 further comprising instructions that, when executed, cause one or more processors to perform the action of modifying the redirect file by changing the target URL to a new target URL such that the new target URL is browsed to in response to a scan of the QR code.

13. The non-transitory computer-readable storage medium of claim 9 further comprising instructions that, when executed, cause one or more processors to perform the action of generating the QR code with the alias URL and a unique identifier.

14. The non-transitory computer-readable storage medium of claim 9 wherein receiving the scan of the QR code occurs after attaching a QR code to a desired location that is associated with the target URL.

15. The non-transitory computer-readable storage medium of claim 9 further comprising instructions that, when executed, cause one or more processors to perform the action of changing the mapping of the alias URL to a different target URL.

16. A method including executing instructions recorded on a non-transitory computer-readable storage medium using at least one processor, the method comprising:

encoding a Quick Response (QR) code with an alias Uniform Resource Locator (URL), wherein the QR Code is affixed to a physical medium and the QR code is to be associated with an object;

attaching the QR code to the object;

navigating a browser application to a target URL that is associated with the object;

scanning the QR code an initial time; and responsive to scanning the QR code the initial time, creating a mapping of the alias URL from the scanned QR code to the target URL such that both the QR code and the target URL are associated with the object in response to receiving a subsequent scan of the QR code.

17. The method of claim 16 wherein scanning the QR code occurs after attaching the QR code to the object.

18. The method of claim 16 further comprising:

generating a redirect file from the mapping; and exporting the redirect file to a web server or to a redirect service such that the target URL is browsed to in response to a scan of the QR code.

19. The method of claim 18 further comprising modifying the redirect file by changing the target URL to a new target URL such that the new target URL is browsed to in response to a scan of the QR code.

20. The method of claim 16 wherein encoding a Quick Response (QR) code comprises encoding the QR code with the alias URL and a unique identifier.

\* \* \* \* \*